(12) United States Patent
Okamoto

(10) Patent No.: US 6,304,539 B1
(45) Date of Patent: Oct. 16, 2001

(54) MULTILAYER PERCEPTION NEURAL NETWORK SCHEME DISK MEMORY DEVICE AND SIGNAL PROCESSING DEVICE

(75) Inventor: Yutaka Okamoto, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/272,608

(22) Filed: Mar. 19, 1999

(30) Foreign Application Priority Data

Mar. 20, 1998 (JP) ................................. 10-071694

(51) Int. Cl.$^7$ ...................................................... G11B 7/00
(52) U.S. Cl. ...................................................... 369/59.22
(58) Field of Search ........................... 369/59, 47, 275.3; 706/15, 11, 22, 10

(56) References Cited

U.S. PATENT DOCUMENTS

| | | | |
|---|---|---|---|
| 5,068,801 | * 11/1991 | Clark | 369/54 |
| 5,272,723 | 12/1993 | Kimoto et al. | 375/11 |
| 5,295,130 | * 3/1994 | Tobita et al. | 369/124 |
| 5,555,231 | * 9/1996 | Yamamoto | 369/54 |
| 5,642,341 | * 6/1997 | Strok | 369/44.37 |
| 5,943,660 | * 8/1999 | Yesildirek et al. | 706/15 |
| 5,950,181 | * 9/1999 | Federal | 706/15 |
| 6,055,524 | * 4/2000 | Cheng | 706/15 |
| 6,067,536 | * 5/2000 | Maruyama et al. | 706/15 |

FOREIGN PATENT DOCUMENTS 6-20075   1/1994   (JP).

* cited by examiner

*Primary Examiner*—Nabil Hindi
(74) *Attorney, Agent, or Firm*—Pillsbury Winthrop LLP (57) ABSTRACT

A disk memory device comprises a head which reads a data recorded on a disk and outputs a read-out signal, an A/D converter which converts the read-out signal into a digital signal, and a signal processing circuit of a multilayer perceptron type neural network scheme which receives the digital signal converted by the A/D converter, wherein the signal processing circuit has an input layer which inputs the digital signal, a hidden layer having a plurality of hidden nodes, and an output layer which outputs an output signal, and the input layer has a weighting arithmetic circuitry which is shared by the each hidden node, calculates a coupling weighting coefficient between the input layer and the plurality of hidden nodes, and outputs a result of multiplying a digital signal by the weighting coefficient to the plurality of hidden nodes.

20 Claims, 6 Drawing Sheets

MULTILAYER PERCEPTION NEURAL NETWORK SCHEME DISK MEMORY DEVICE AND SIGNAL PROCESSING DEVICE

BACKGROUND OF THE INVENTION

The present invention relates to a disk memory device which records and reproduces an optical, a magnetic or an optical-magnetic data by using a disk as a record medium, especially, to a signal processing device used to a data reproduction operation.

Conventionally, a disk memory device which optically, magnetically or optical-magnetically records and reproduces data on a disk (storage medium) has a read-out signal processing circuit to reproduce (decode) data (data recorded on the disk) from the read-out signal (read signal) read from the disk with a read head (including a read/write composite head). In the disk memory device, there are a magnetic disk drive which is called hard disk drive (HDD), an optical disk drive, and a magnetic-optical disk drive, specifically. The read-out signal processing circuit is often constructed specifically by an exclusive IC which integrally includes record and reproduction function as a read/write circuit.

The read-out signal processing circuit roughly comprises an amplifier which amplifies the read-out signal read from the head, a waveform equalization circuit to waveform-equalize the read-out signal waveform, a data detection circuit to perform a data detection processing (identification processing of binarization), and a decoder (decoding circuit) to decode to the record data.

The waveform equalization circuit makes the detection error rate in the data detection processing within the permissive range by correcting the waveform distortion caused by the result of passing the record channel (system which consists of the record medium/the head) when data is recorded on the disk. Conventionally, a linear equalization method of correcting linear distortion of the read-out signal by modeling the record channel to the linear system is adopted. Specifically, an adaptive digital filter to adaptively follow to the characteristic change of the record channel is often adopted.

Recently, the signal processing technology of the PRML (Partial Response Maximum Likelihood) method is being adopted as a data detection circuit. This PRML method is a method to sequentially detect data by using the correlation before and behind the read-out signal waveform, and, specifically, the Viterbi decoder is used.

In recent years, for example, a high record density like several Gbits/in$^2$ has been achieved in HDD to make the memory capacity of the disk memory device mass. In such a high record density, since it is impossible to set a linear model to the binary data recorded on the disk in a response characteristics of the conventional record channel, it is necessary to consider a nonlinear element. Here, when the ratio of a nonlinear distortion becomes large, the equalization residual error increases in the linear equalization circuit, and securing the detection error rate within the permissive range becomes difficult in the data detection processing.

The waveform equalization circuit, which uses a hierarchical network or multilayer perceptron type neural network scheme (Hereafter, so called as a MLP type) is proposed as a method to equalize a nonlinear distortion of the read-out signal waveform. A nonlinear waveform distortion in the read-out signal is removed by the MLP type equalization circuit, then the data detection processing is executed with the conventional data detection circuit.

Figure 1:
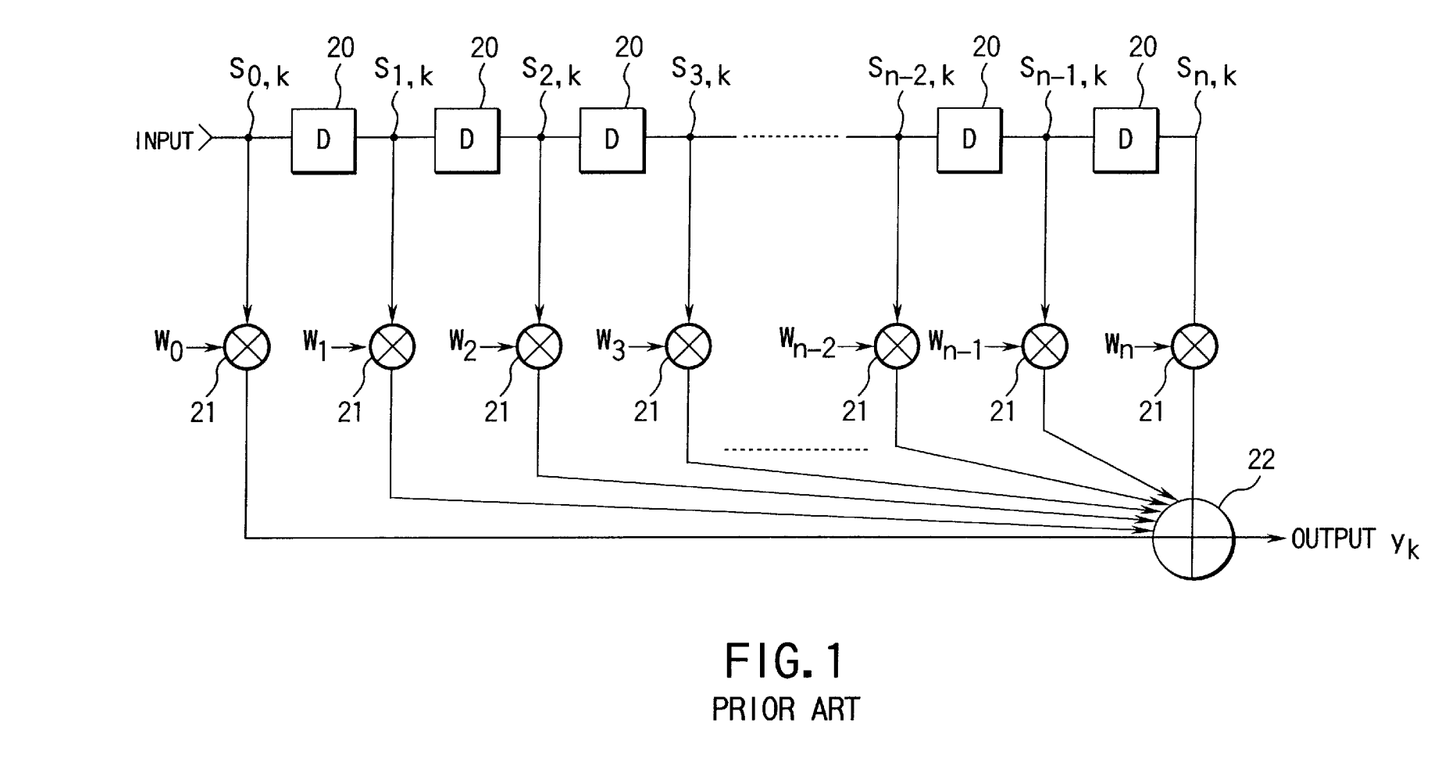
FIG. 1 is a block diagram which shows the configuration of the conventional FIR type linear equalization circuit.

Here, the FIR (Finite Impulse Response) type linear equalization circuit used with the conventional read-out signal processing circuit is constructed as shown for example in FIG. 1, and has a delay circuit of a plurality of taps, multipliers 21, and adder circuits 22 having a configuration by which delay elements 20 which have the same delay time as the clock cycle of the channel is connected in series. Each multiplier 21 multiplies an equalization coefficient $W_n$ (gain) to the delayed signal (signal sample value $S_{n,k}$) from each tap and outputs it. Adder circuits 22 add outputs of each multiplier 21, and output an output value $Y_k$ of the linear equalization circuit.

Figure 2:
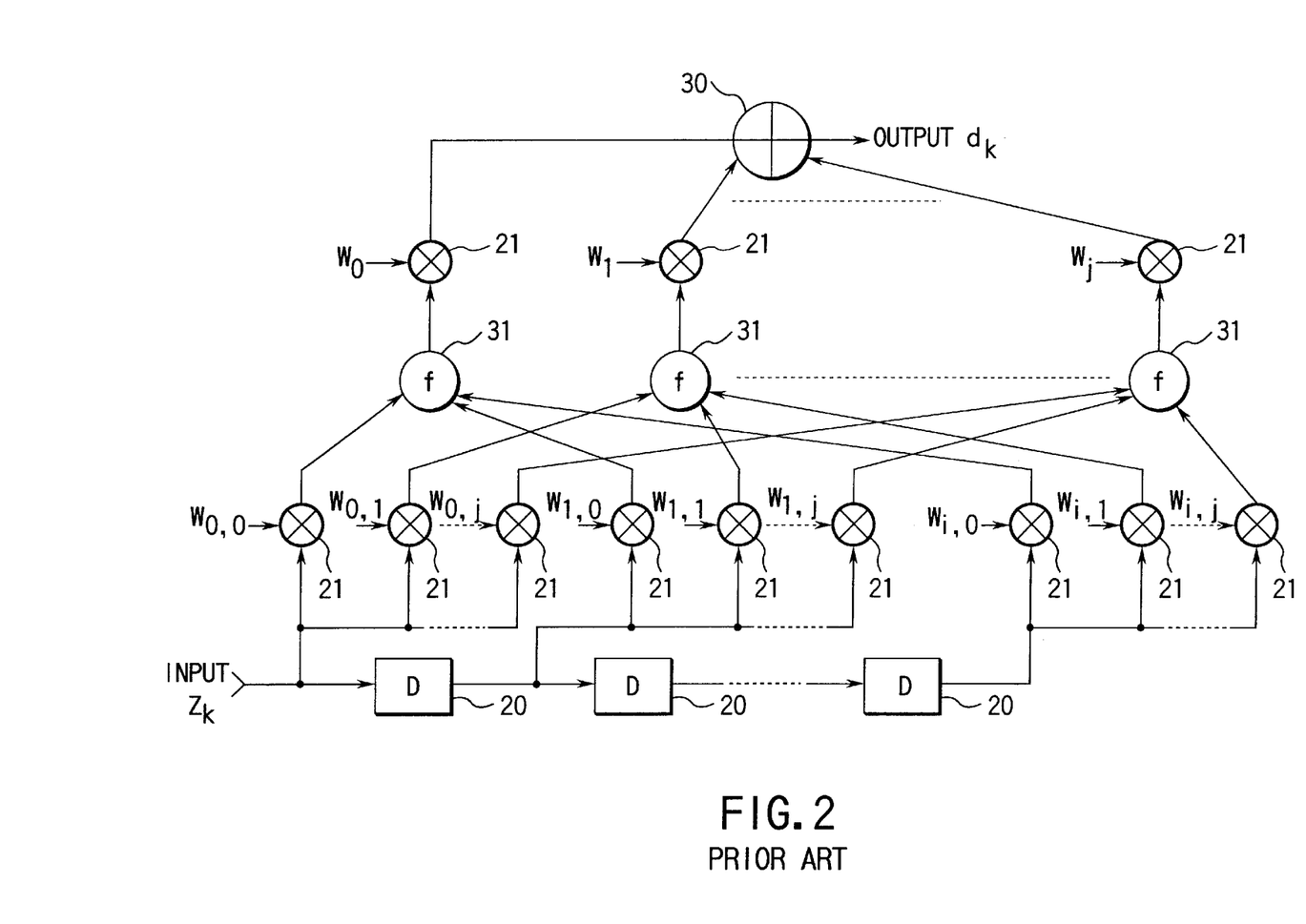
FIG. 2 is a block diagram which shows the configuration of the conventional MLP type waveform equalization circuit.
Figure 3:
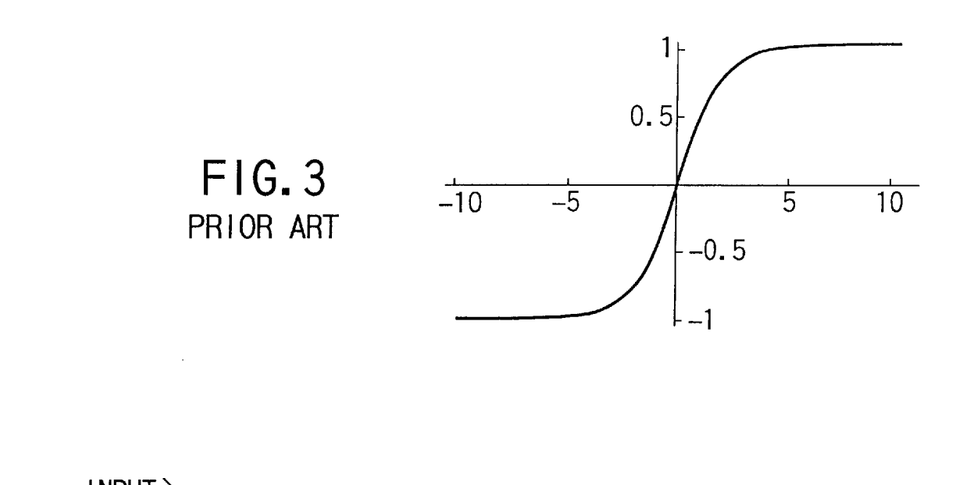
FIG. 3 is a characteristic chart which shows the conventional sigmoid function.

On the other hand, the MLP type waveform equalization circuit is constructed as shown for example in FIG. 2. Here, a configuration of the hidden node 31 shown in FIG. 2 is almost similar to the FIR type linear equalization circuit shown in above-mentioned FIG. 1. That is, a signal is input to the delay circuit of a plurality of taps having delay elements 20 which have the same delay time as the channel clock cycle and are connected in series, and all the results of multiplying the delayed signal from each tap by the weighting coefficient are added. The MLP type waveform equalization circuit differs from the FIR type linear equalization circuit, and an output of a hidden node is a value obtained by evaluating an added result of all inputs by the nonlinear function which is called sigmoid function shown in FIG. 3.

In addition, in the MLP type waveform equalization circuit, the number of hidden layers constructed with a set of hidden nodes which share the layer on the input side without the connection relationship mutually and the numbers of hidden nodes which construct one layer are determined according to the equalization performance requested to the equalization circuit. It is assumed that a hidden layer is one layer, and the number of hidden nodes is j for the simplification in FIG. 2. Nodes of hidden layers other than a hidden layer which is the nearest the delay line add all of the result of multiplying the output of each hidden node in one pervious stage by the equalization coefficient, and output the value in which the addition result is evaluated by the sigmoid function shown in FIG. 3. The output node 30 adds all of the result of multiplying the output of each hidden node in one previous stage by the equalization coefficient, and outputs the addition result ($d_k$) as it is.

As mentioned above, with a high recording density in the disk memory device, a nonlinear distortion component which is occupied to the distortion element included in the read-out signal waveform when data is reproduced from the disk, increases up to the extent which cannot be disregarded. Therefore, the necessity of the nonlinear waveform equalization processing to remove a nonlinear distortion component becomes large. Therefore, it becomes general that the MLP type waveform equalization circuit is used with the linear equalization circuit in the read-out signal processing circuit. However, though the delay line on the input side of each hidden node in the lowest rank layer can be shared by each hidden node as shown in FIG. 2, the multipliers (21) to multiply the number of taps of the input delay lines and the numbers of hidden nodes are needed in the MLP type waveform equalization circuit only for constructing a hidden node in the low rank layer. Therefore, the circuit scale of the MLP type waveform equalization circuit becomes large compared with the conventional linear equalization circuit. Moreover, since the MLP type waveform equalization circuit has at least one hidden layer, the number of stages of multipliers increases and the processing time for referring to the sigmoid function increases.

BRIEF SUMMARY OF THE INVENTION

An object of the present invention is to provide a high capacity and a high performance disk memory device to become able to lower the data detection error rate by removing the influence of the nonlinear distortion component of the read-out signal by using the MLP type waveform equalization circuit, and lower the increase of the circuit scale and the processing time, in the disk memory device which has the read-out signal processing circuit.

A disk memory device according to present invention comprises: a head which reads a data recorded on a disk and outputs a read-out signal; an A/D converter which converts the read-out signal into a digital signal; and a signal processing circuit of a multilayer perceptron type neural network scheme which recieves the digital signal converted by the A/D converter, wherein the signal processing circuit has an input layer which inputs the digital signal, a hidden layer having a plurality of hidden nodes, and an output layer which outputs an output signal, and the input layer has a weighting arithmetic circuitry which is shared by the each hidden node, calculates a coupling weighting coefficient between the input layer and the plurality of hidden nodes, and outputs a result of multiplying a digital signal by the weighting coefficient to the plurality of hidden nodes. A signal processing device of a multilayer perceptron type neural network scheme in which a predetermined digital signal processing is executed to a digital signal, comprises: an input layer which inputs the digital signal; a hidden layer having a plurality of hidden nodes; and an output layer which outputs an output signal, wherein the input layer has a weighting arithmetic circuitry which is shared by the each hidden node, calculates a coupling weighting coefficient between the input layer and the plurality of hidden nodes, and outputs a result of multiplying a digital signal by the weighting coefficient to the plurality of hidden nodes.

The preferred manner is as follows in each above-mentioned device.

(1) The input layer of the signal processing circuit has a plurality of registers which latches the digital signal and a plurality of adders adding outputs of the registers, and output addition results to the each hidden node.

(2) The weighting arithmetic circuit in the input layer outputs multiple values of the digital signal and weighting coefficient. Here the weighting coefficient is a power of 2 or a sum of two powers to 2, and the weighting coefficient is obtained by learning with a backpropagation algorithm.

(3) Each hidden node of the signal processing circuit has a plurality of delay circuits connected in series, a plurality of adding circuits, and an arithmetic circuitry which evaluates an input value by a sigmoid function and outputs it.

(4) The signal processing circuit is a nonlinear waveform equalization processing circuit which performs a waveform equalization processing of the read-out signal.

(5) The signal processing circuit is a nonlinear digital signal processing circuit which performs a waveform equalization processing and a data detection processing of the read-out signal.

With such a configuration, it becomes possible to decrease the number of multipliers compared with the conventional MLP type waveform equalization circuit by sharing the arithmetic circuits to calculate the coupling weighting coefficient of the input sides of each hidden node. In this case, since the output of each hidden node becomes the value evaluated by the nonlinear function which is called a sigmoid function, the MLP type waveform equalization circuit has a characteristic to which the equalization performance is not deteriorated even if the accuracy of the equalization coefficient of the multiplier is lowered. It is also practicably possible to take only a power of 2 or a sum of two powers to 2 for example as an equalization coefficient.

In the disk memory device, for example, such as an optical disk drive according to the present invention as described above, when the MLP type waveform equalization circuit is used in high record density, this invention prevent the nonlinear equalizer circuit using multilayer perceptron from increase of the circuit scale and increase of the signal processing time. Therefore, it becomes possible to lower the data detection error rate by removing the influence of the nonlinear distortion component of the read-out signal of the disk memory device, and to provide a high capacity and an high performance disk memory device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereafter, embodiment of present invention referring to drawing will be explained.

Figure 4:
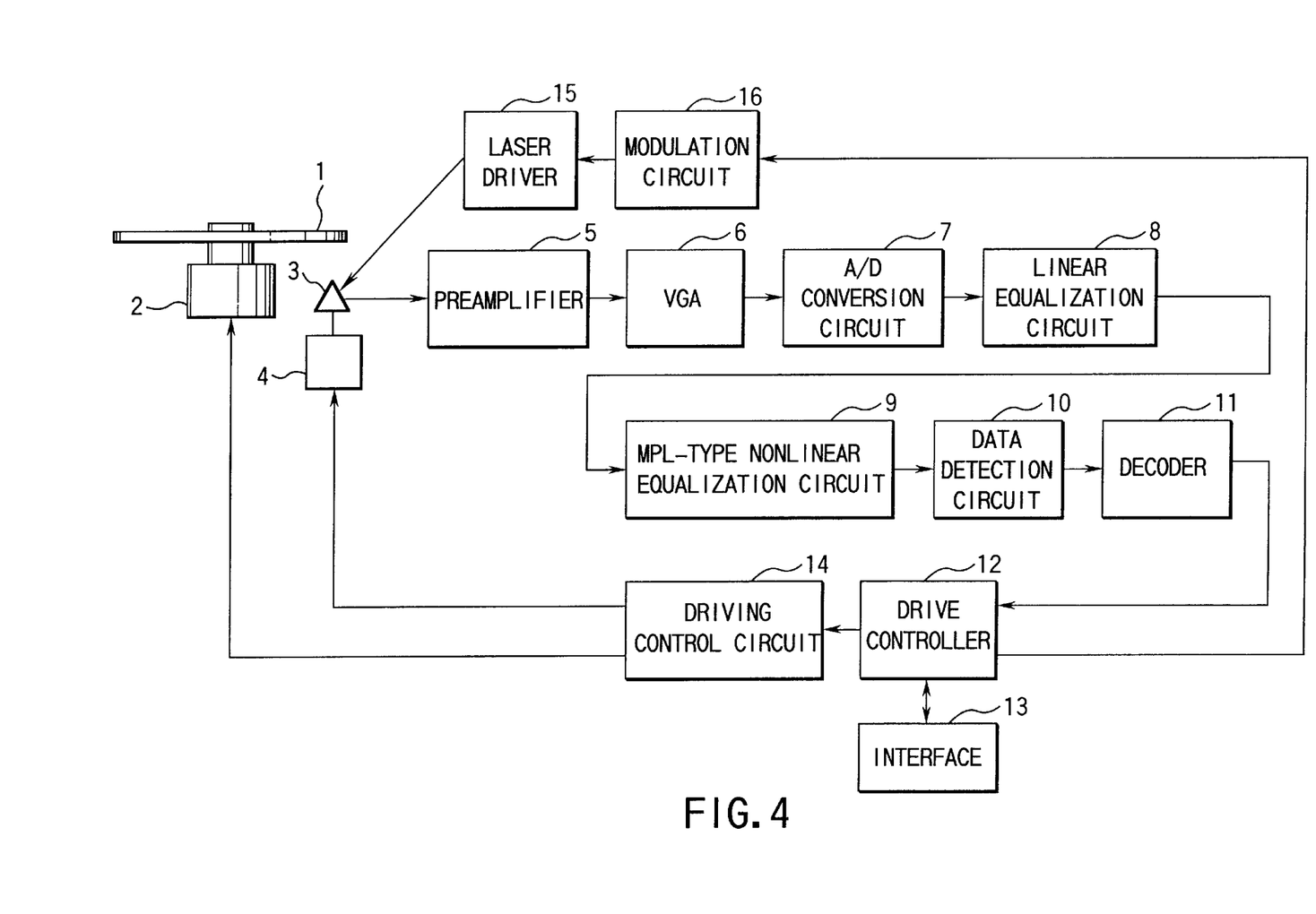
FIG. 4 is a block diagram which shows the main part of the optical disk drive relating to the embodiment of the present invention.
Figure 5:
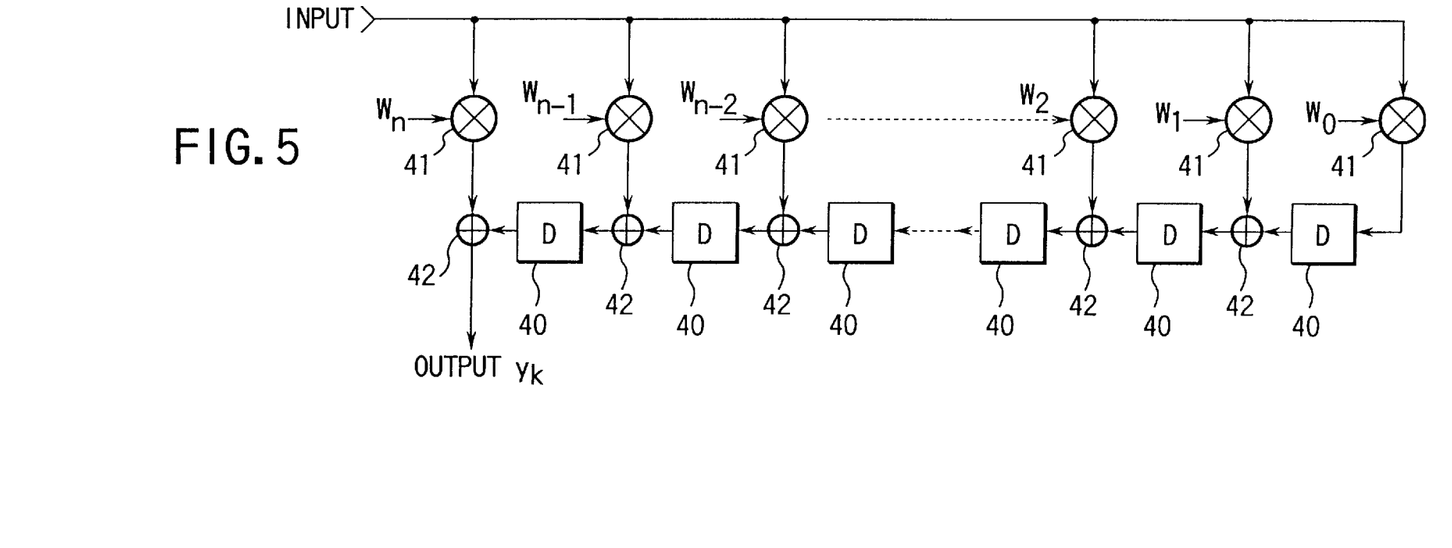
FIG. 5 is a block diagram which shows the configuration of the FIR type linear equalization circuit relating to the embodiment.
Figure 6:
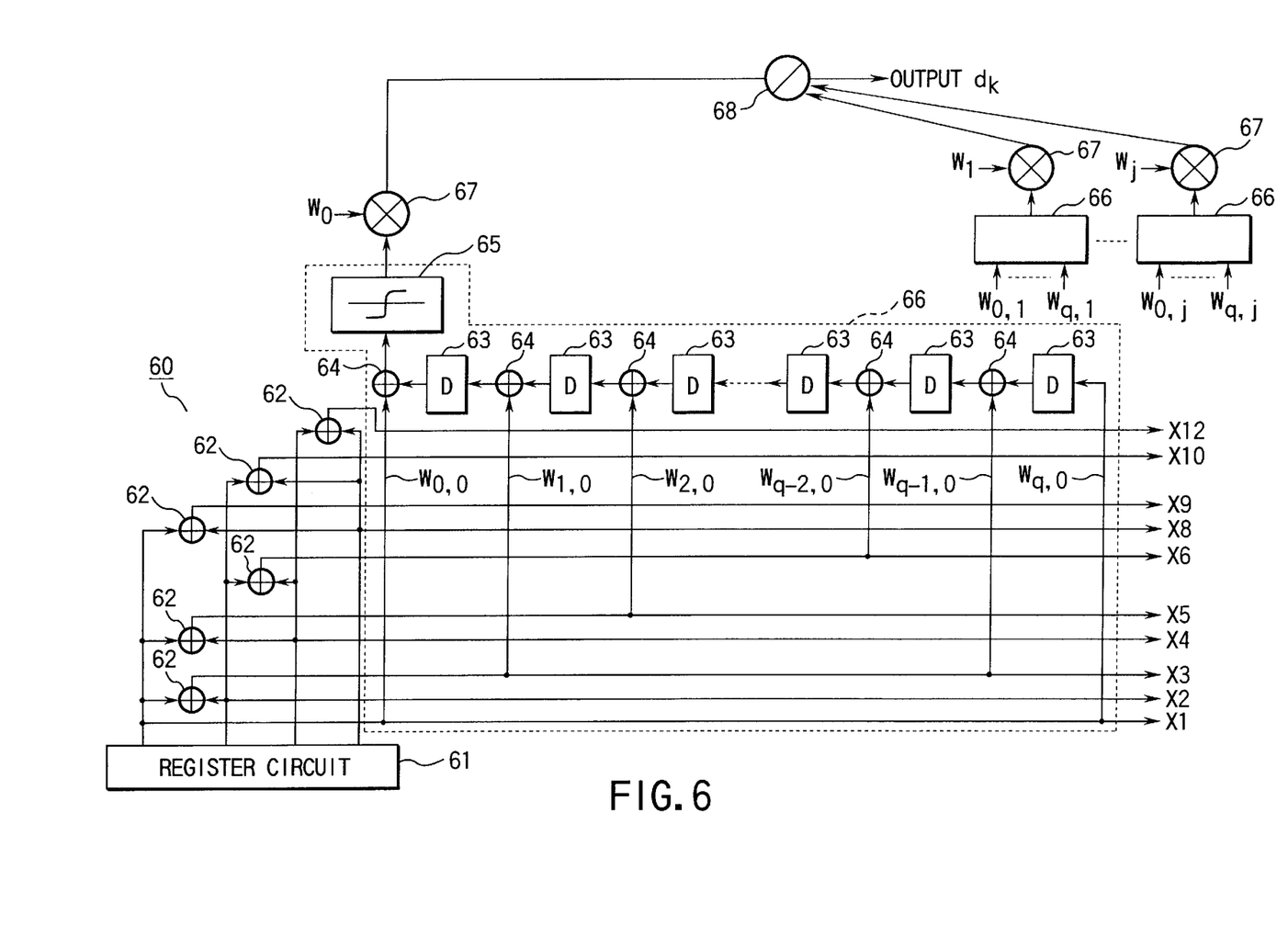
FIG. 6 is a block diagram which shows the configuration of the signal processing circuit of the multilayer perceptron type neural network configuration relating to this embodiment.
Figure 7:
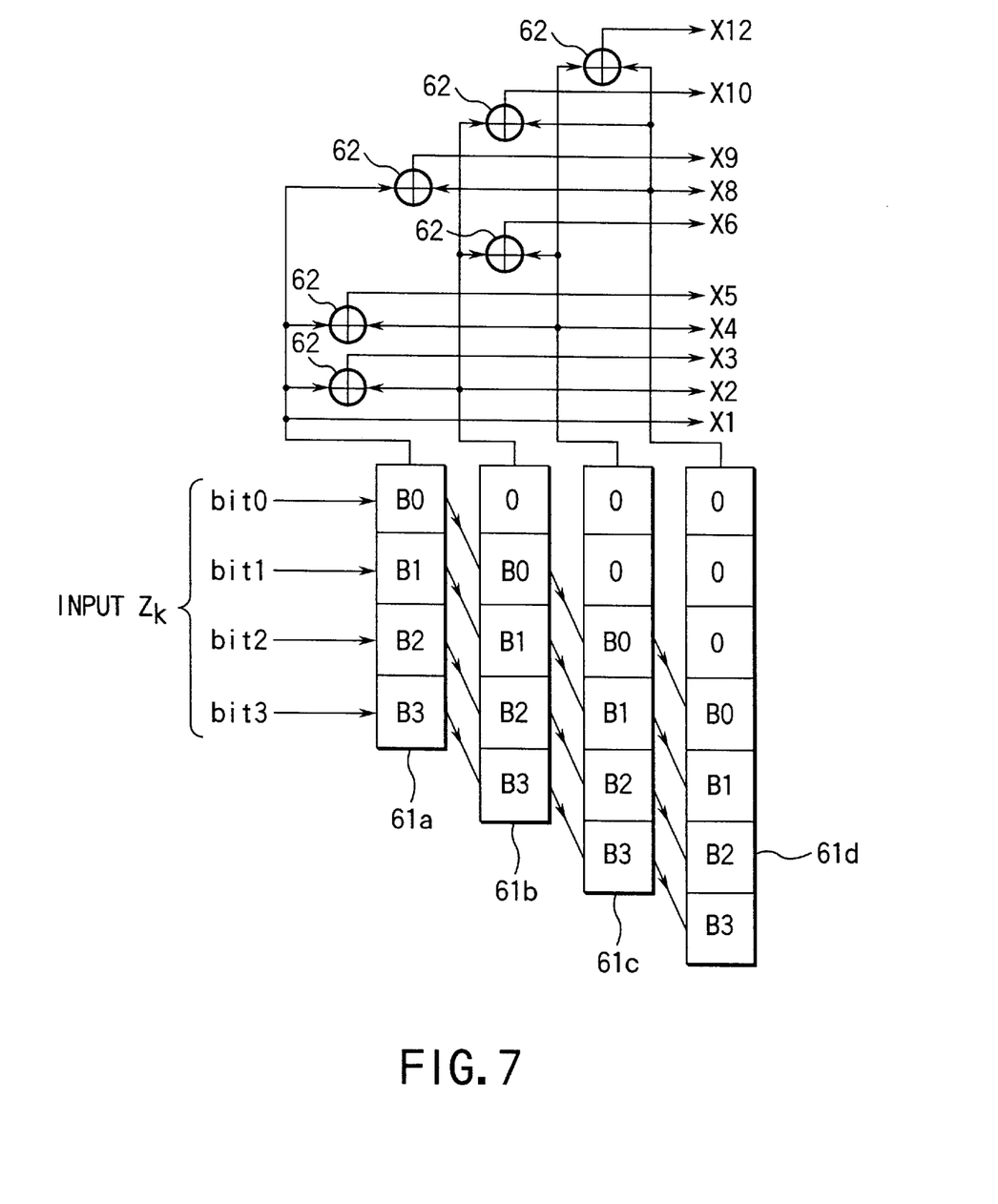
FIG. 7 is a block diagram which shows a specific configuration of the register shown in FIG. 6.

FIG. 4 is a block diagram which shows the main part of the optical disk drive relating to the embodiment. FIG. 5 is a block diagram which shows the configuration of the FIR type linear equalization circuit relating to the embodiment. FIG. 6 and FIG. 7 are block diagrams which show the configuration of the MLP type signal processing circuit relating to the embodiment.

(Configuration of Device)

It is assumed that this embodiment applied to the rewritable optical disk drive as the disk memory device. The optical disk drive has a rewritable optical disk 1 which is the record medium, an optical picking up 3, a data reproduction system, a data record system, a drive controller 12, and an interface 13 as shown in FIG. 4. The optical disk 1 is rotated by the spindle motor 2. The optical picking up 3 is moved and adjusted by the servo motor 4, and irradiates the laser light to the optical disk 1 by the drive with the laser driver 15 to optically record and reproduce the information. The spindle motor 2 and the servo motor 4 is driven and controlled by the drive controller 12 through the driving control circuit 14.

The data record system has a laser driver 15 and a modulation circuit 16. The modulation circuit 16 executes the encoding processing in which the record data sent from the drive controller 12 is converted into the predetermined bit stream. The laser driver 15 drives the optical picking up 3 to record the mark on the disk 1 according to the bit stream output from the modulation circuit 16.

The data reproduction system (read-out signal processing circuit) has a preamplifier 5, a variable gain amplifier (VGA), 6, an A/D converter 7, a linear equalization circuit 8, a signal processing circuit 9 (waveform equalization circuit) of the multilayer perceptron type neural network scheme (MLP type), a data detection circuit 10, and a decoder 11. The preamplifier 5 and the VGA 6 amplify the read-out signal read by the light picking up 3. The A/D converter 7 converts the amplified read-out signal into a digital signal which is the quantization sample value at the discrete time.

The linear equalization circuit 8 is a circuit to reinforce the equalization performance of the MLP type signal processing circuit 9, and a kind of a digital filter. The MLP type signal processing circuit 9 removes the nonlinear distortion component from the read-out signal as shown in FIG. 6 and FIG. 7, and constructs the nonlinear equalization circuit of three layer perceptron type to equalize the signal in a suitable characteristic for the data detection processing in the data detection circuit 10. The data detection circuit 10 is maximum likelihood sequence detector to detect data from the read-out signal waveform equalized to partial response, and, specifically, consists of a Viterbi decoder. The decoder 11 restores the bit stream detected by the data detection circuit 10 to an original data (record data).

The drive controller 12 is a main controller of the device, is connected with, for instance, a personal computer and a television receiver through the interface 13, and controls transfer control of the record reproduction data. A moving images compression circuit necessary for the record and reproduction operation of image information, a moving images extension circuit, and an error detection correction circuit which performs an error detection and correction processing of the data demodulated by demodulator circuit 10 are also included in the device (not shown).

(Configuration of MLP Type Signal Processing Circuit 9)

It is assumed that the MLP type signal processing circuit 9 of the embodiment is a MLP type digital signal processing circuit having three layers in convenience, and functions as a nonlinear waveform equalization circuit to remove the nonlinear distortion component as shown in FIG. 6 and FIG. 7.

It is assumed that an input signal (signal sample value Zk) is a digital data in four bits (B3, B2, B1, B0) as shown in FIG. 7. Moreover, a coupling weighting coefficient of the input sides of the hidden node 66 described later is assumed to be only values of a power of 2 or a sum of two powers to 2. In addition, it is assumed that the number of taps of the delay circuits 63 of the input layer is "q+1", and the number of the hidden nodes is "j+1".

The input layer 60 is constructed, and has an adding circuit which consists of the register 61 and a plurality of adders 62. The weighting arithmetic circuitry of the input layer 60 in which the weight coefficient is multiplied with the input signal to be output is shared by all the hidden nodes 66. The hidden nodes 66 each has a plurality of delay circuits 63 connected in series, a plurality of adders 64, and an arithmetic circuit 65 which evaluates an input value by the sigmoid function and outputs it.

In addition, the signal processing circuit 9 has the multipliers 67 each of which multiplies by the output of each hidden node 66 and equalization coefficient W0–Wj and the output node 68 to add the output of each multiplier 67 and to output an output value dk.

The register 61 is constructed with four registers 61a to 61d as shown in FIG. 7. Each register 61a to 61d shifts a sample value Zk which is an input signal respectively by one bit and latches. That is, values of multiple of each of one time, twice, four times, and eight times of the input sample value Zk are set in each register 61a to 61d. The adding circuit performs all combinations of two outputs from registers 61a to 61d by the adder 62. As a result, the adding circuit generates ten kinds of multiples (X1 to X6, X8 to X10, X12) to the sample value Zk.

(Advantage and Function of the Embodiment)

Here, a same output yk can fundamentally be obtained for the same input with the FIR type linear equalization circuit shown in FIG. 1 and the FIR type linear equalization circuit shown in FIG. 5. In the configuration of the FIR type linear equalization circuit shown in FIG. 1, all of the values of the signal input to each multiplier 21 and the values of the equalization coefficient W0 to Wn are different from each other. On the other hand, all the same input values are input to each multiplier 41 in the configuration of the FIR type linear equalization circuit shown in FIG. 5. Since the configuration of hidden nodes in the lowest rank layer of the MLP type equalization circuit as the above-mentioned is almost the same as the FIR type linear equalization circuit.

Therefore, it is possible to make input values of one side the same in all multipliers connected with the input side of hidden nodes in the lowest rank layer. The total of the multiplier connected with the input side of hidden nodes in the lowest rank layer is a value by which the number of taps of delay circuits and the number of hidden nodes are multiplied. In this case, it is often values of the equalization coefficient of these multipliers are the same in a plurality of multipliers. In the configuration of the FIR type linear equalization circuit shown in FIG. 1, since there is a case the tap position of the input signal is different, it cannot always be the multipliers common. On the other hand, since the multipliers can surely be shared in the configuration of the FIR type linear equalization circuit shown in FIG. 5, the number of multipliers which are shared can be decreased.

In addition, though the adding circuit 22 obtains the sum total of the output of n multipliers 21 and outputs it in the configuration of the FIR type linear equalization circuit shown in FIG. 1, an n−1 additions of two numbers actually executed. Therefore, when all arithmetics cannot be completed by restriction of an operation speed of an element of the adding circuit within the channel clock cycle, it is necessary to execute a pipeline processing to temporarily store an intermediate result in the register. Therefore, even if a hidden node is only one layer, delay time becomes one or several clock cycles. It is desirable the delay time of the equalization circuit is small as much as possible, since the format efficiency on the disk is lowered to absorb a timing by the delay of the data output of the read-out signal processing circuit, the control band is lowered when the equalization output is used to control feedback, and so on. On the other hand, it is possible to limit only to the addition processing of two numbers at one time in one clock cycle in the configuration of the FIR type linear equalization circuit shown in FIG. 5.

Hereafter, an operation of the MLP type signal processing circuit 9 shown in FIG. 6 and FIG. 7 will be explained.

It is assumed that the weighting coefficient $W_{q,0}$ to (q+1)th taps are "1" on one hidden node 66 as shown in FIG. 6. In this case, the output of the register 61a where the value of an integral multiple (a multiple of one in this case) of the input signal (sample value Zk) is set is input to an end most register 63 among the registers 63 which operates as a delay circuit by latching an input value of each channel clock as shown in FIG. 7.

After the one channel clock, the output of the register 63 (delay circuit) of the end is added to a signal which corresponds to the value by which the weighting coefficient to q-th tap is multiplied, and is input to the following register 63 (delay circuit). The weighting coefficient to q-th tap is "3" ($=2^0+2^1$) here. The signal, which corresponds to the value to multiply the value of the weighting coefficient to the q-th tap by the signal, becomes a signal of the sum of which each output of the register 61a which outputs one time value and the register 61b which outputs twice value of the register 61a with the adder 62. The output according to the connection configuration of the register 63 and the adder 64 which construct the delay circuit is obtained in the same way. Finally, the output of the register 63 of the last stage and the signal which corresponds to the value by which the weighting coefficient $W_{0,0}$ to the first tap are multiplied are finally added by the adder 64, and the addition result is input to the arithmetic circuitry 65 which evaluates by the sigmoid function.

Here, an output $H_{O,k}$ of the hidden node at time k becomes the value to which the sum total of the input is evaluated by the sigmoid function f as shown in following formula (1). That is, the output $H_{O,k}$ is added the signal which corresponds to the value by which the weighting coefficient to the tap is multiplied and is indicated by the next formula.

$$H_{0,k} = f(\Sigma_i W_{i,0} \cdot Z_{k-i}) \quad (1)$$

$$f(x) = (1 - \exp(x))/(1 + \exp(-x)) \quad (2)$$

In addition, the outputs of the hidden nodes 66 are also multiplied with coupling weighting coefficients ($W_0$ to $W_j$) by the multiplier 67, and become one of the input of the output node 68. An output of the output node 68, that is, the output $d_k$ of the MLP type signal processing circuit 9 at time k becomes the input sum total of the output node 68. Therefore, the corresponding output $d_k$ is shown in the next formula.

$$d_k = \Sigma_j W_j (\Sigma_i W_{i,j} \cdot Z_{k-i}) \quad (3).$$

Here, a value obtained by applying a backpropagation algorithm to the program which simulates, for example, the MLP type equalization circuit of the configuration shown in FIG. 2, and repeating the learning procedure is used as the value of each coupling weighting coefficient.

As mentioned above, according to the embodiment, the total of the multiplier can be decreased by sharing the multiplier by all hidden nodes for the conventional MLP type waveform equalization circuit of the configuration shown in FIG. 2. Therefore, an increase at the circuit scale and the processing calculation delay time can be controlled.

If the present invention is applied to the waveform equalization circuit in the reproduce signal processing circuit of the optical disk drive like the embodiment, the nonlinear equalization circuit which can effectively control a nonlinear distortion of the read-out signal can be constructed with an easy circuit scale. The MLP type signal processing circuit of this embodiment can be applied also to the circuit by which the nonlinear equalization circuit 9 and the data detection circuit 10 are integrated.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A disk memory device comprising:
   a head which reads a data recorded on a disk and outputs a read-out signal;
   an A/D converter which converts the read-out signal into a digital signal; and
   a signal processing circuit of a multilayer perception type neural network scheme which receives the digital signal converted by said A/D converter,
   wherein said signal processing circuit has an input layer which inputs the digital signal, a hidden layer having a plurality of hidden nodes, and an output layer which outputs an output signal, and
   said input layer has an adding circuit which outputs a plurality of signals, and said hidden layer has a weighting arithmetic circuitry which is shared by each of said plurality of hidden nodes, calculates a coupling weighting coefficient between said input layer and said plurality of hidden nodes, and outputs a result thereof to said output layer.

2. The disk memory device according to claim 1, wherein said adding circuit of said signal processing circuit has a plurality of registers which latches the digital signal and a plurality of adders adding outputs of said registers, and output addition results to each hidden node.

3. The disk memory device according to claim 2, wherein said weighting arithmetic circuit in the input layer outputs multiple values of the digital signal and weighting coefficient.

4. The disk memory device according to claim 3, wherein said weighting coefficient is a power of 2 or a sum of two powers to 2.

5. The disk memory device according to claim 3, wherein said weighting coefficient is obtained by learning with a backpropagation algorithm.

6. The disk memory device according to claim 1, wherein each hidden node of said signal processing circuit has a plurality of delay circuits connected in series, a plurality of adding circuits, an arithmetic circuitry, which evaluates an input value by a sigmoid function, and a weighting function.

7. The disk memory device according to claim 1, wherein said signal processing circuit is a nonlinear waveform equalization processing circuit which performs a waveform equalization processing of said read-out signal.

8. The disk memory device according to claim 1, wherein said signal processing circuit is a nonlinear digital signal processing circuit which performs a waveform equalization processing and a data detection processing of said read-out signal.

9. A signal processing device of a multilayer perceptron type neural network scheme in which a predetermined digital signal processing is executed to a digital signal, comprising:

an input layer which inputs the digital signal;

a hidden layer having a plurality of hidden nodes; and an output layer which outputs an output signal, wherein said input layer has an adding circuit which outputs a plurality of signals, and said hidden layer has a weighting arithmetic circuitry which is shared by each of said plurality of hidden nodes, calculates a coupling weighting coefficient between said input layer and said plurality of hidden nodes, and outputs a result thereof to said output layer.

10. The signal processing device according to claim 9, wherein said adding circuit of said signal processing circuit has a plurality of registers which latches the digital signal and a plurality of adders adding outputs of said registers, and output addition results to each hidden node.

11. The signal processing device according to claim 10, wherein said weighting arithmetic circuit in the input layer outputs multiple values of the digital signal and weighting coefficient.

12. The signal processing device according to claim 11, wherein said weighting coefficient is obtained by learning with a backpropagation algorithm.

13. The signal processing device according to claim 9, wherein each hidden node of said signal processing circuit is constructed by a plurality of delay circuits connected in series, a plurality of adders, an arithmetic circuitry, which evaluates an input value by a sigmoid function, and a weighting function.

14. The signal processing device according to claim 9, wherein said signal processing circuit is a nonlinear waveform equalization processing circuit which performs a waveform equalization processing of said read-out signal.

15. The signal processing device according to claim 9, wherein said signal processing circuit is a nonlinear digital signal processing circuit which performs a waveform equalization processing and a data detection processing of said read-out signal.

16. An optical disk drive comprising:

a light pickup which reads a data recorded on a disk and outputs a read-out signal;

an A/D converter which converts the read-out signal into a digital signal; and a signal processing circuit of a multilayer perceptron type neural network scheme which receives the digital signal converted by the A/D converter, wherein said signal processing circuit has an input layer which inputs the digital signal, a hidden layer having a plurality of hidden nodes, and an output layer which outputs an output signal, and said input layer has an adding circuit which outputs a plurality of signals, and said hidden layer has a weighting arithmetic circuitry which is shared by each of said plurality of hidden nodes, calculates a coupling weighting coefficient between said input layer and said plurality of hidden nodes, and outputs a result thereof to said output layer.

17. The optical disk drive according to claim 16, wherein said adding circuit of said signal processing circuit has a plurality of registers which latches the digital signal and a plurality of adders adding outputs of said registers, and output addition results to each hidden node.

18. The optical disk drive according to claim 16, wherein each hidden node of said signal processing circuit has a plurality of delay circuits connected in series, a plurality of adding circuits, an arithmetic circuitry, which evaluates an input value by a sigmoid function, and a weighting function.

19. The optical disk drive according to claim 16, wherein said signal processing circuit is a nonlinear waveform equalization processing circuit which performs a waveform equalization processing of said read-out signal.

20. The optical disk drive according to claim 16, wherein said signal processing circuit is a nonlinear digital signal processing circuit which performs a waveform equalization processing and a data detection processing of said read-out signal.

* * * * *